(12) United States Patent
Smith et al.

(10) Patent No.: US 11,745,453 B2
(45) Date of Patent: Sep. 5, 2023

(54) METHOD OF MAKING AND USING A REUSABLE MOLD FOR FABRICATION OF OPTICAL ELEMENTS

(71) Applicant: Continental Automotive Systems, Inc., Auburn Hills, MI (US)

(72) Inventors: Elliot John Smith, Ventura, CA (US); Jacob A Bergam, Santa Barbara, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 351 days.

(21) Appl. No.: 16/810,745

(22) Filed: Mar. 5, 2020

(65) Prior Publication Data

US 2021/0276291 A1 Sep. 9, 2021

(51) Int. Cl.
*B29D 11/00* (2006.01)

(52) U.S. Cl.
CPC .. *B29D 11/00375* (2013.01); *B29D 11/00442* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,597,613 A * | 1/1997 | Galarneau | | G02B 5/1857 427/269 |
| 8,742,406 B1 * | 6/2014 | Leung | | H01L 51/5275 257/40 |
| 2005/0032272 A1 * | 2/2005 | Prather | | H01L 24/11 257/E21.508 |
| 2006/0273478 A1 * | 12/2006 | Jin | | G02B 3/02 264/1.32 |
| 2011/0318691 A1 * | 12/2011 | Tsuchimura | | C07D 213/20 544/5 |
| 2014/0234468 A1 * | 8/2014 | Taniguchi | | B82Y 10/00 428/432 |
| 2014/0335215 A1 * | 11/2014 | Hayashi | | B82Y 10/00 204/192.15 |
| 2016/0075987 A1 * | 3/2016 | Zhang | | C12M 35/06 435/395 |
| 2017/0090294 A1 * | 3/2017 | Kriman | | B29D 11/00307 |
| 2017/0114465 A1 * | 4/2017 | Kalutarage | | C23C 16/308 |
| 2019/0086695 A1 * | 3/2019 | Kim | | G02F 1/133365 |
| 2019/0333431 A1 * | 10/2019 | Dodson | | G09G 5/003 |
| 2021/0172581 A1 * | 6/2021 | Oganesian | | F21V 5/004 |

FOREIGN PATENT DOCUMENTS

JP 2018115392 A 7/2018
JP 2018148235 A 9/2018

OTHER PUBLICATIONS

Bernard C. Kress "Field Guide to Digital Micro-Optics" SPIE Field Guide, 2014, pp. 123-154, SPIE, Bellingham, WA.

* cited by examiner

*Primary Examiner* — Nduka E Ojeh

(57) ABSTRACT

A method includes applying a polymer to a mold, the mold having microstructures with the polymer flowing into the microstructures when applied to the mold. The method includes pressing an inorganic substrate onto the polymer. The method includes curing the polymer to fix the polymer to the inorganic substrate to form an optical element from the polymer and the inorganic substrate, the optical element having microstructures formed by the microstructures in the mold. The method includes releasing the optical element from the mold.

21 Claims, 8 Drawing Sheets

METHOD OF MAKING AND USING A REUSABLE MOLD FOR FABRICATION OF OPTICAL ELEMENTS

BACKGROUND

An optical element shapes and directs light. For example, an optical element may be or include a diffractive optical element, a diffractive diffuser, a refractive diffuser, a computer-generated hologram, a blazed grating, etc.

As one example, a Lidar system may include an optical element. The Lidar system includes a photodetector, or an array of photodetectors. Light from a light emitter is emitted into the field of view of the photodetector. The photodetector detects light that is reflected by an object in the field of view. For example, a flash Lidar system emits pulses of light, e.g., laser light, into the field of view. The detection of reflected light is used to generate a 3D environmental map of the surrounding environment. The time of flight of the reflected photon detected by the photodetector is used to determine the distance of the object that reflected the light.

The Lidar system may be mounted on a vehicle to detect objects in the environment surrounding the vehicle and to detect distances of those objects for environmental mapping. The output of the Lidar system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

Some applications, e.g., in a vehicle, include several Lidar systems. For example, the multiple system may be aimed in different directions and/or may detect light at different distance ranges, e.g., a short range and a long range. Lidar systems include optical elements that shape light emitted by the light emitter.

The optical elements (including but not limited to optical elements for Lidar systems) may be manufactured by a microfabrication process. For example, the optical element may be manufactured from a blank of material, such as transparent plastic or glass, that takes its desired shape by masking and wet etching, photolithography or photoengraving with photoresist, etc.

DETAILED DESCRIPTION

Figure 1:
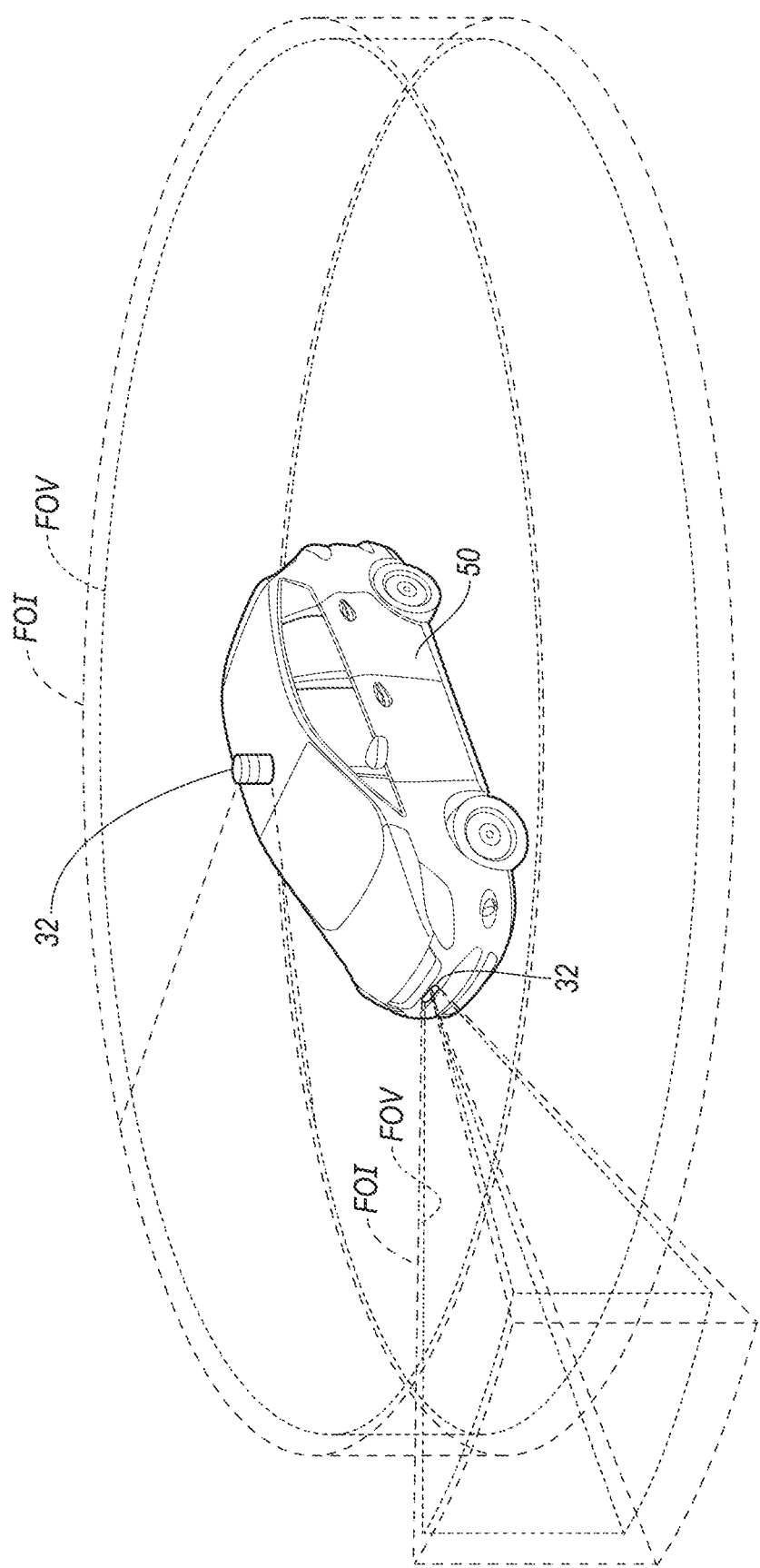
FIG. 1 is a perspective view of a vehicle with Lidar systems.

With reference to the Figures, wherein like numerals indicate like parts throughout the several views, a method of making an optical element 30 for a Lidar system 32 includes applying a polymer 34 to a mold 36, the mold 36 having microstructures 38 with the polymer 34 flowing into the microstructures 38 when applied to the mold 36. The method includes pressing an inorganic substrate 40 onto the polymer 34. The method includes curing the polymer 34 to fix the polymer 34 to the inorganic substrate 40 to form the optical element 30 from the polymer 34 and the inorganic substrate 40, the optical element 30 having microstructures 42 formed by the microstructures 38 in the mold 36. The method includes releasing the optical element 30 from the mold 36. The mold 36 is reusable such that the method may be repeatedly performed with the same mold 36, thus reducing the time and cost to manufacture the optical element 30.

Figure 2:
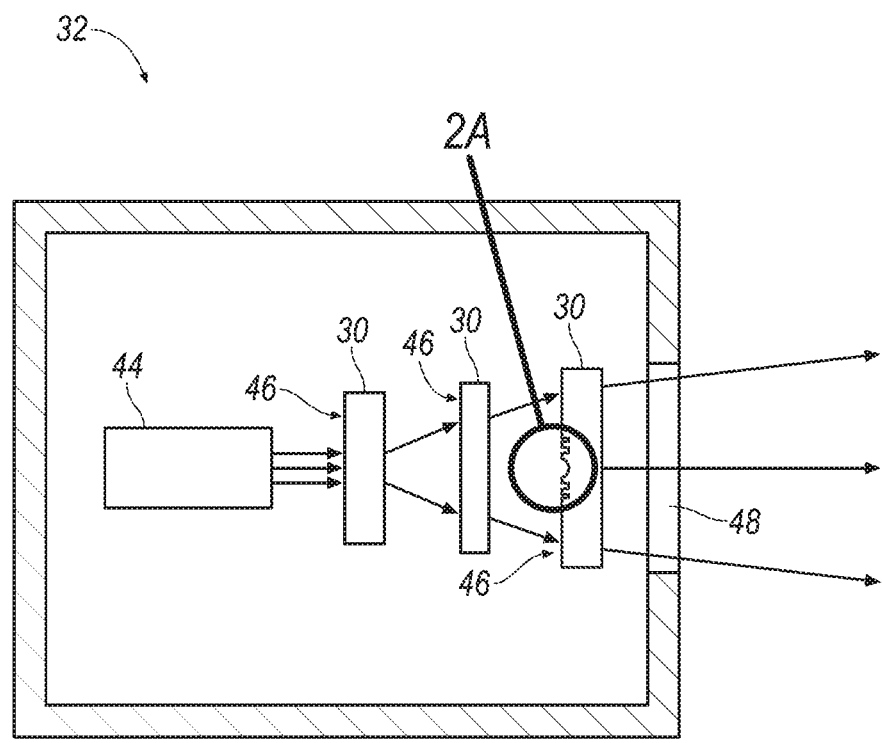
FIG. 2 is a cross section schematic of a Lidar system.
Figure 2A:
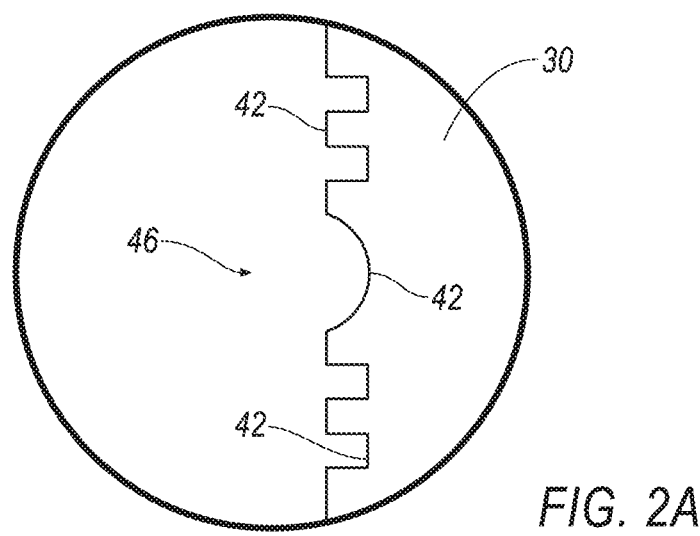
FIG. 2A is an enlarged view of a portion of FIG. 2.

With reference to FIGS. 1 and 2, the Lidar system 32 emits light and detects the emitted light that is reflected by an object, e.g., pedestrians, street signs, vehicles, etc. Specifically, a light emitter 44 emits light through an exit window 48 to a field of illumination FOI. The light emitted from the light emitter 44 is shaped by a light-shaping region 46 of the optical element 30 before exiting an exit window 48. The Lidar system 32 includes a light-receiving system, including a light sensor, that has a field of view FOV that overlaps the field of illumination FOI and receives the reflected light. In addition to the light sensor, the light-receiving system may include receiving optics, as are known. The Lidar system 32 may be a solid-state Lidar system, e.g., a flash Lidar system, or may be a scanning Lidar system.

The Lidar systems shown in FIG. 1 are mounted on a vehicle 50. In such an example, the Lidar systems 32 are operated to detect objects in the environment surrounding the vehicle 50 and to detect distance of those objects for environmental mapping. The output of the Lidar systems 32 may be used, for example, to autonomously or semi-autonomously control operation of the vehicle 50, e.g., propulsion, braking, steering, etc. Specifically, the Lidar systems 32 may be a component of or in communication with an advanced driver-assistance system (ADAS) of the vehicle 50. The Lidar systems 32 may be mounted on the vehicle 50 in any suitable position and aimed in any suitable direction. As one example, the Lidar system 32 is shown on the front of the vehicle 50 and directed forward. As another example, the Lidar system 32 is shown mounted on a roof of the vehicle 50. The vehicle 50 shown in the Figures is a passenger automobile. As other examples, the vehicle 50 may be of any suitable manned or un-manned type including a plane, satellite, drone, watercraft, etc.

The light emitter 44 may be, for example, a semiconductor laser. In one example, the light emitter 44 is a verticalcavity surface-emitting laser (VCSEL). As another example, the light emitter 44 may be a diode-pumped solid-state laser (DPSSL). As another example, the light emitter 44 may be an edge emitting laser diode. The light emitter 44 may be designed to emit a pulsed flash of light, e.g., a pulsed laser light. Specifically, the light emitter 44, e.g., the VCSEL, DPSSL, or edge emitter, is designed to emit a pulsed laser light or train of laser light pulses. The light emitted by the light emitter 44 may be, for example, infrared light. Alternatively, the light emitted by the light emitter 44 may be of any suitable wavelength. The Lidar system 32 may include any suitable number of light emitters 44. In examples that include more than one light emitter 44, the light emitters 44 may be identical or different.

The light emitter 44 is aimed at the optical element 30, i.e., substantially all of the light emitted from the light emitter 44 reaches the optical element 30. Specifically, the light emitter 44 is aimed at the light-shaping region 46 of the optical element 30. The light emitter 44 may be aimed directly at the optical element 30 or may be aimed indirectly at the optical element 30 through intermediate reflectors/deflectors, diffusers, optics, etc. In other words, light from the light emitter 44 may travel directly from the light emitter 44 to the optical element 30 or may interact with additional components, such as additional optical elements 30, between the light emitter 44 and the optical element 30.

The light-shaping region 46 of the optical element 30 shapes light that is emitted from the light emitter 44. As one example of shaping the light, the light-shaping region 46 of the optical element 30 diffuses the light, i.e., spreads the light over a larger path and reduces the concentrated intensity of the light. In other words, the light-shaping region 46 of the optical element 30 is designed to diffuse the light from the light emitter 44. As another example, the light-shaping region 46 of the optical element 30 scatters the light, e.g., a hologram.

The light-shaping region 46 includes microstructures 42. The microstructures 42 provide a surface profile to the optical element 30 in the light-shaping region 46 that shapes the light. For example, the microstructures 42 may include curves, valleys, planar surfaces, angles of intersection, etc. More specifically, the microstructures 42 may include Freznel patterns, Fourier patterns, blazed gratings, DOE's, phase gratings or microlenses.

The light-shaping region 46 may be transmissive, i.e., transmits light from the light emitter 44 through the light-shaping region 46. In other words, light from the light emitter 44 is transmitted through and exits the light-shaping region 46 or is externally reflected by the light-shaping region 46. Specifically, when transmitted through the light-shaping region 46, the light from the light emitter 44 enters a front side of the optical element 30 and exits a back side of the optical element 30, and the optical element 30 shapes the light. The light-shaping region 46 may be reflective, i.e., reflects light from the light emitter 44. In other words, the light from the light emitter 44 is externally reflected by the light-shaping region 46. In an example in which the light-shaping region 46 is reflective, the light-shaping surface may be a coating on a relatively less transmissive substrate 40.

The optical element 30 directs the shaped light to the exit window 48 for illuminating the field of illumination FOI exterior to the Lidar system 32. In other words, the optical element 30 is designed to direct the shaped light to the exit window 48, i.e., is sized, shaped, positioned, and/or has optical characteristics to direct at least some of the shaped light to the exit window 48.

The optical element 30 may be of any suitable type that shapes and directs light from the light emitter 44 toward the exit window 48. For example, the optical element 30 may be or include a diffractive optical element, a diffractive diffuser, a refractive diffuser, a computer-generated hologram, a blazed grating, etc.

As one example, the optical element 30 is an inorganic material, i.e., having a chemical compound that does not contain carbon-hydrogen bonds. For example, the optical element 30 have a silica-based compound, such as silicon dioxide ($SiO_2$). As another example, the optical element 30 is a combination of an inorganic material, i.e., having a chemical compound that does not contain carbon-hydrogen bonds and an organic material, For example, the optical element 30 have a silica-based compound, such as silicon dioxide ($SiO_2$) in combination with an organic compound, like an optical polymer.

Figure 3:
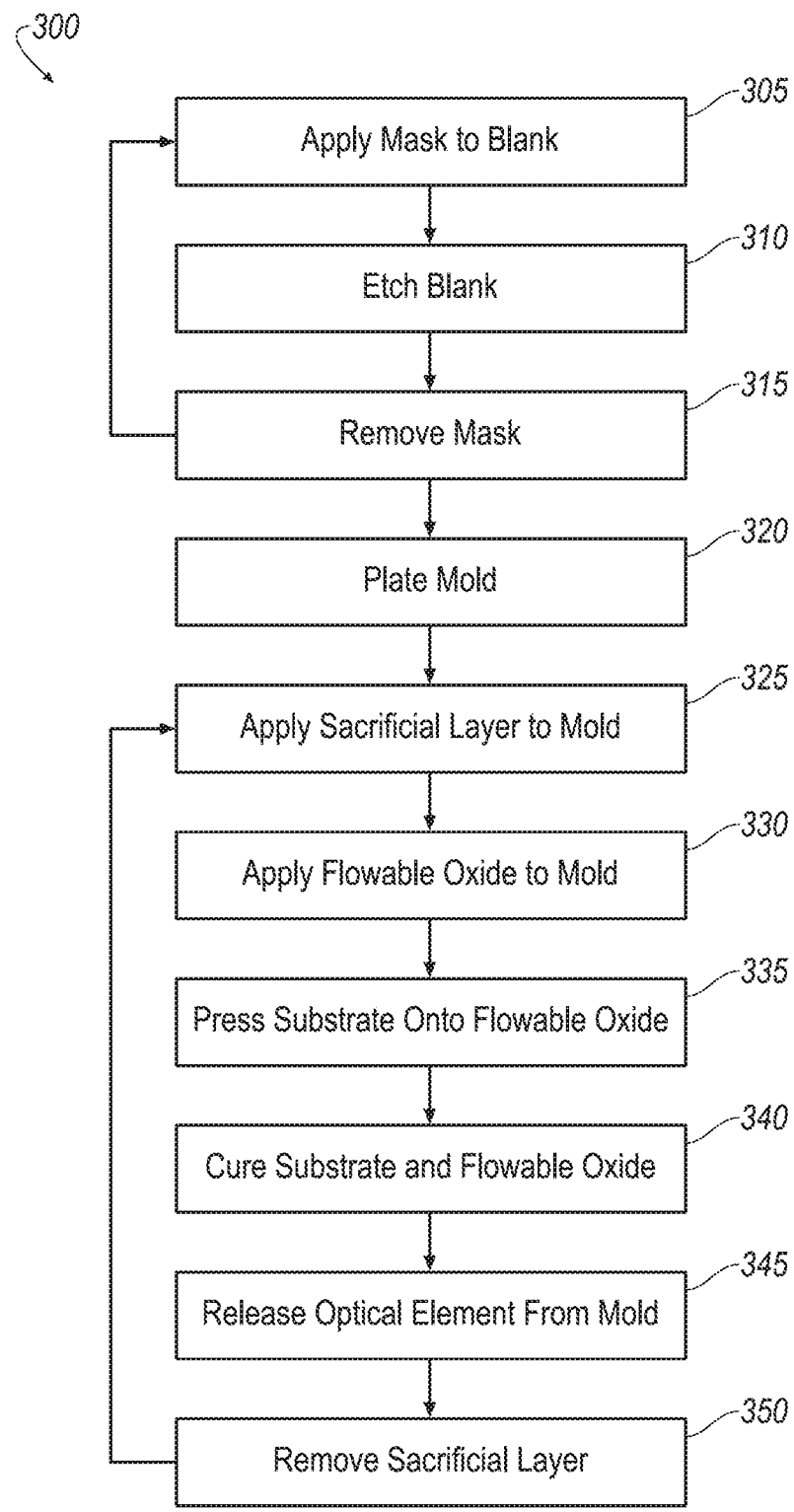
FIG. 3 is a flow chart illustrating a process for making an optical element of the Lidar system.
Figure 4:
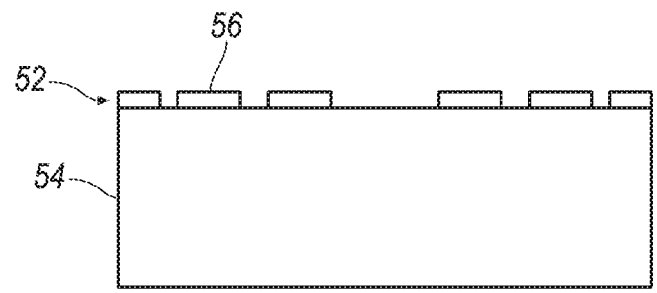
FIG. 4 is an illustration of a blank with a mask for making a mold used to make the optical element.

With reference to FIG. 3, an exemplary process 300 of making the optical element 30 is shown. The process may begin at a block 305 where a mask 52 is applied to a blank 54 that will be formed into the mold 36. As one example, the blank 54 may be nitride, an oxide, a metal, a composite, or any other suitable material which can be used as a transfer layer. The nitride may allow for easy release of the optical element 30 from the mold 36 after curing the polymer 34. Specifically, the nitride may and the polymer 34 may be of the type that allows for easy release of the optical element 30 from the mold 36. An additional sacrificial layer may be used for ease of removal or the optical element 30 from the mold 36

The mask 52, illustrated in FIGS. 4, 5, 7, and 8, controls removal of material from the blank 54. The mask 52 may include a photoresist material 56. For example, the mask 52 may include a mixture of diazonaphthoquinone (DNQ) and novolac resin (a phenol formaldehyde resin), an epoxy-based polymer, an off-stoichiometry thiol-enes (OSTE) polymer, etc. The mask 52 may include a hard mask 58, e.g., an inorganic material that is not as easily etched by oxygen, fluorine, chlorine or other reactive gases during plasma etching as compared to a polymeric mask 52. The hard mask is also used to assist in a better defined and controlled etch.

Figure 5:
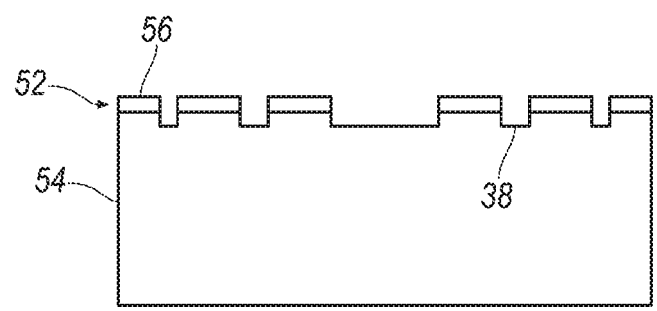
FIG. 5 is an illustration of the blank after etching and having the mask of FIG. 4.
Figure 7:
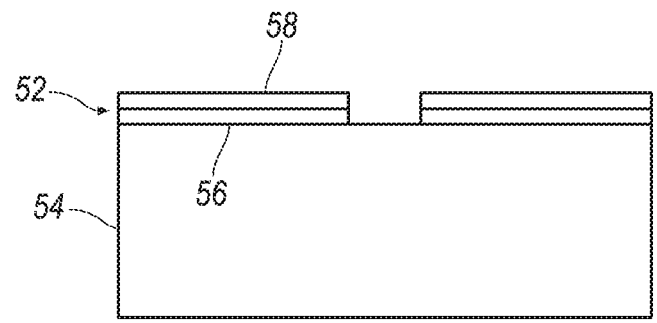
FIG. 7 is an illustration of a blank with a mask for making a mold used to make the optical element.

Next at a block 310, the blank 54 with the mask 52 is etched. Etching removes material from the blank 54, e.g., to provide microstructures 38 on a surface of the mold 36 as illustrated in FIGS. 5 and 7. The microstructures 38 of the mold 36 may be used to form the microstructures 42 of the optical element 30. For example, the microstructures 38 of the mold 36 may be inverse in geometry to the microstructures 42 of the optical element 30.

Figure 8:
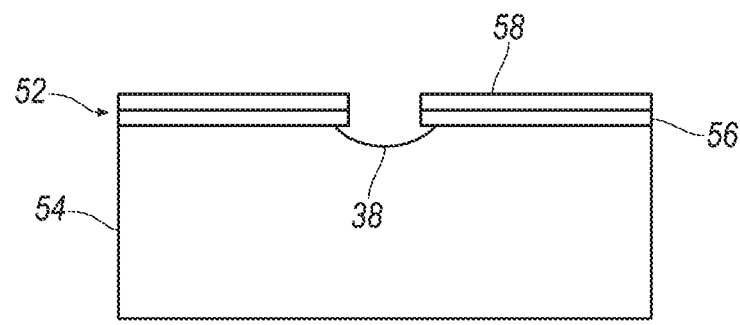
FIG. 8 is an illustration of the blank after etching and having the mask of FIG. 7.

The microstructures 38 may be manufactured by a microfabrication process. As one example, the blank 54 with the mask 52 may be etched by plasma etching. Plasma etching includes directing a high-energy stream of glow discharge (plasma) of an appropriate gas mixture at the blank 54 with the mask 52. The plasma source, known as etch species, can be either charged (ions) or neutral (atoms and radicals). For example, etching may include hydrogen plasma etching or microwave plasma etching. Plasma etching can be an anisotropic etch process that produces linear sidewalls, as illustrated in FIG. 5, or an isotropic etch which produces curved surfaces. This effect is depending on the balance between ion bombardment and chemical/or polymerizing etchants, as illustrated in FIG. 8.

As another example of a microfabrication process, the blank 54 with the mask 52 may be etched by wet etching. Wet Etching is an etching process that utilizes liquid chemicals or etchants to remove material from the blank 54, e.g., in specific patterns defined by the mask 52. For example, liquid-phase etchant, such as diluted hydrofluoric acid (dHF), may be applied to the blank 54 with the mask 52, e.g., via immersion. Wet etching is an isotropic etch process that produces rounded sidewalls that may undercut edges of the mask 52, as illustrated in FIG. 8.

Figure 6:
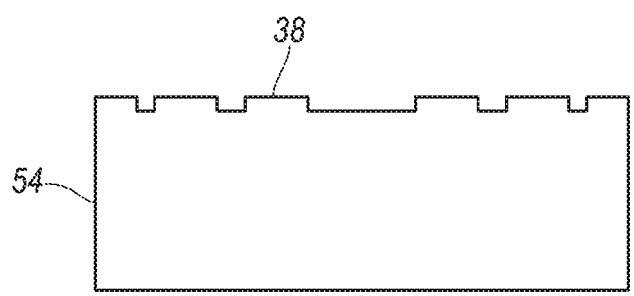
FIG. 6 is an illustration of the blank of FIG. 5 without the mask.
Figure 9:
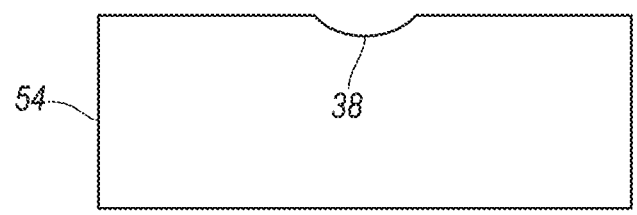
FIG. 9 is an illustration of the blank of FIG. 8 without the mask.

Next at a block 315 the mask 52 is removed from the blank 54. The mask 52 may be mechanically removed, e.g., pulled off or otherwise physically separated. The mask 52 may also be removed with a solvent, e.g., dissolved potassium hydroxide (KOH) may be used to remove the photoresist material 56. The blank 54 with the mask 52 removed is illustrated in FIGS. 6 and 9.

Figure 10:
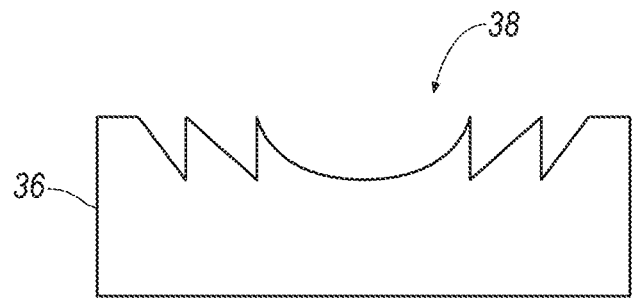
FIG. 10 is an illustration of a mold used to make the optical element.
Figure 11:
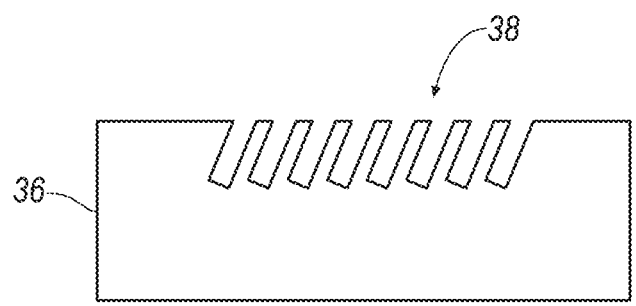
FIG. 11 is an illustration of a mold used to make the optical element.
Figure 12:
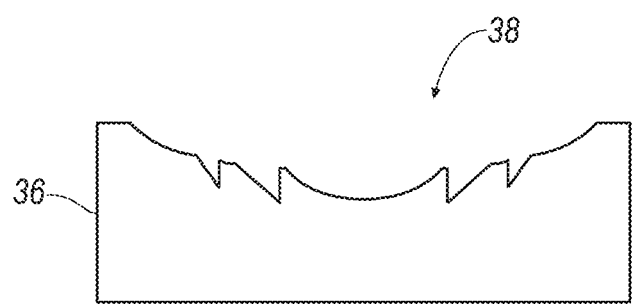
FIG. 12 is an illustration of a mold used to make the optical element.

The blocks 305, 310, and/or 315 may be repeated until the blank 54 is in a desired shape for the mold 36. In other words, the blocks 305, 310, and/or 315 may be repeated until the mold 36 has microstructures 38 suitable for forming the microstructures 42 of the optical element 30. Molds 36 with various shaped microstructures 38 producible by executing blocks 305, 310, and 315 are illustrated in FIGS. 10-12.

At a block 320 the mold 36 formed from the blank 54 is plated. For example, the mold 36 may be nickel plated, i.e., the process of plating the blank 54 with nickel plating. The nickel plating may provide easier release of an optical element 30 from the mold 36, e.g., relative to release of an optical element 30 from a similar shaped mold 36 without plating.

At the conclusion of block 320, manufacture of the mold 36 is complete and the mold 36 may be repeatedly used to manufacture a plurality of optical elements 30. Specifically, each optical element 30 is individually manufactured by the operation of blocks 325 through 350, as described further below.

Figure 13:
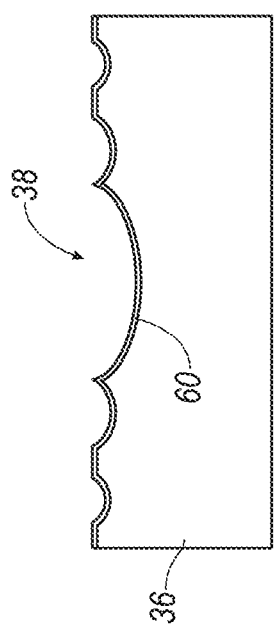
FIG. 13 is an illustration of a mold with a sacrificial layer and used to make an optical element.
Figure 14:
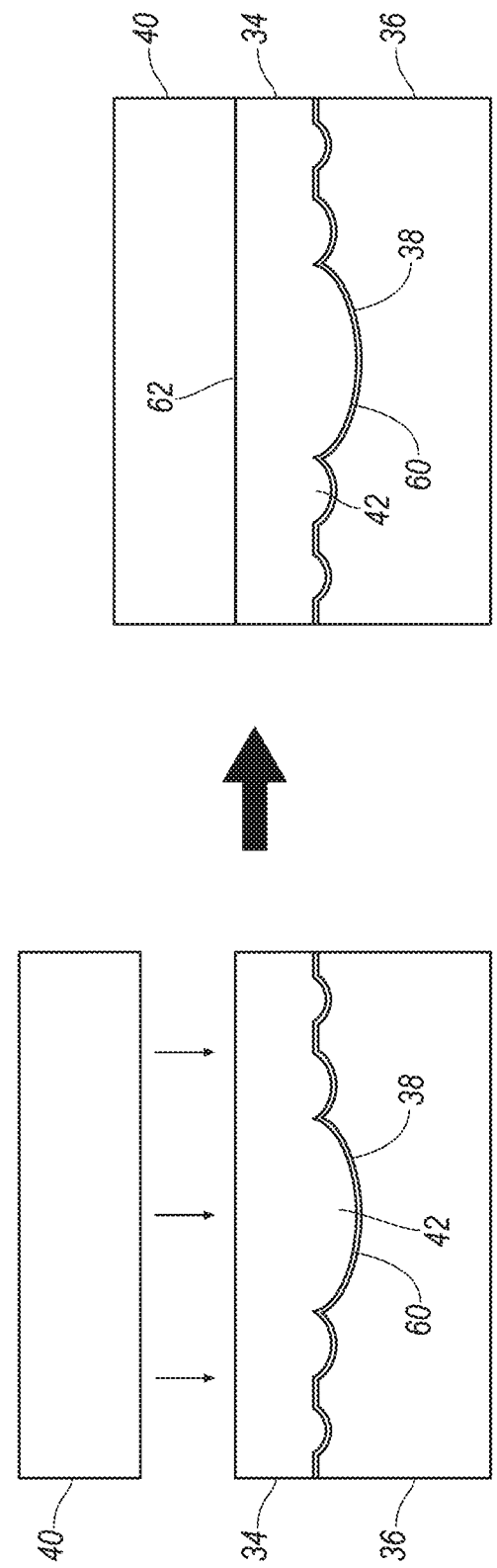
FIG. 14 is an illustration of a polymer applied to the mold and a substrate pressed to the polymer.
Figure 15:
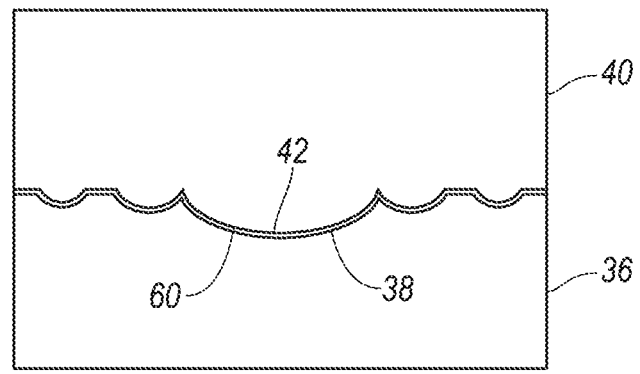
FIG. 15 is an illustration of an optical element made from the polymer and the substrate and attached to the mold.

At a block 325 a sacrificial layer 60, illustrated in FIGS. 13-15, is applied to the mold 36. The sacrificial layer 60 may provide easier release of the optical element 30 from the mold 36. The sacrificial layer 60 may be used in addition to, or as an alternative to, plating the mold 36 as described in block 320. The sacrificial layer 60 and/or the plating aids in release of the optical element 30 from the mold 36 after the polymer 34 is cured (i.e., after block 340 described below). The sacrificial layer 60 may be, for example, a photoresist material, silicon nitride, or other suitable material that may be removed from the mold 36 and/or optical element 30 after forming the optical element 30. The sacrificial layer 60 may be applied to the mold 36 before applying the polymer 34 to the mold 36 at a block 330.

At the block 330 polymer 34 is applied to the mold 36, as illustrated in FIG. 14. The polymer 34 is an inorganic material. As an example, the polymer 34 may be a flowable oxide (FOX), such as silicon-dioxide, after being cured, e.g., at a block 340. In examples in which the polymer 34 is a flowable oxide, the flowable oxide may include hydrogen silsesquioxane and volatile methyl siloxane. One such flowable oxide is known as FOx-25 Flowable oxide, available from Dow Chemical.

During application, the polymer 34 flows into the microstructures 38 of the mold 36. In other words, the polymer 34 conforms completely to the shape of the microstructures 38. For example, the mold 36 may be mounted on a wheel, or other spinning apparatus, and applying the polymer 34 to the mold 36 may include spinning the polymer 34 onto the mold 36. Centrifugal force on the polymer 34 from the spinning may urge the polymer 34 into conforming to the microstructures 38 and mirroring their shape.

At the block 335 the inorganic substrate 40 is pressed onto the polymer 34 on the mold 36, also illustrated in FIG. 14. The polymer 34 may be pre-baked after application of the polymer 34 to the mold 36, e.g., after spinning, and before pressing the substrate 40 onto the polymer 34. The inorganic substrate 40 provides a base to which the polymer 34 is fixed. The inorganic substrate 40 may be silicon, such as silicon-dioxide, or any material that is sufficiently transparent and durable enough for use in the Lidar system 32. The substrate 40 may be pressed onto the polymer 34 with a hydraulic press, or other suitable structure. Pressing the inorganic substrate 40 onto the polymer 34 may produce a part line 62 between the substrate 40 and polymer 34. The part line 62 defines an identifiable boundary between the substrate 40 and the flowable mold 36. Alternatively, the substrate 40 may simply be places onto the flowable material, allowing physical forces like van der waals to fill in the part lines.

At the block 340 the polymer 34 is cured to the inorganic substrate 40. Curing the polymer 34 to the inorganic substrate 40 fixes the polymer 34 to the inorganic substrate 40 to form the optical element 30 from the polymer 34 and the inorganic substrate 40. The curing may be performed with the polymer 34 and the inorganic substrate 40 in the mold 36, as described below and shown in FIG. 3. As another example, the polymer 34 and inorganic substrate 40 may be removed from the mold 36 prior to curing, i.e., subsequently cured after removal from the mold 36. In other words, block 340 may be after block 345 in FIG. 3.

Curing the polymer 34 to the inorganic substrate 40 includes curing both the polymer 34 and the inorganic substrate 40. In other words, both the polymer 34 and the inorganic substrate 40 may be subjected to the curing described herein. During such simultaneous exposure to the curing, the inorganic substrate 40 may remain unchanged and the polymer 34 changes in chemistry and/or structure. Curing the polymer 34 and the inorganic substrate 40 creates the optical element 30. The optical element 30 has microstructures 38 formed by the microstructures 38 in the mold 36.

Curing the polymer 34 to the inorganic substrate 40 may include an ultraviolet curing process as well as elevated temperature. The ultraviolet curing process includes applying ultraviolet light to the polymer 34 and the inorganic substrate 40. The ultraviolet light may initiate a photochemical reaction that generates a crosslinked network of polymers. Mercury vapor lamps, ultraviolet light emitting diodes (LEDs), or other suitable ultraviolet light sources may be used to provide the ultraviolet light. Curing the polymer 34 to the inorganic substrate 40 may include annealing the polymer 34 and the inorganic substrate 40. For example, the polymer 34 and the inorganic substrate 40 may be heated and then permitted to slowly cool. Annealing removes internal stresses and toughens the polymer 34 and the inorganic substrate 40. Annealing may include steam annealing as well as a N2 dry anneal. Such a steam anneal may be performed at multiple hundreds of degree Celsius, more specifically, greater than 400° C., even more specific greater than 550° C. Whereas a N2 dry anneal may be performed at even greater temperature, more specifically, greater than 800° C., even more specific greater than 950° C. Steam annealing removes internal stresses and toughens both the polymer 34 and the inorganic substrate 40 without introducing impurities. For example, ultra-high-purity steam, also known as clean steam, may be applied to the both the polymer 34 and the inorganic substrate 40, thereby heating both the polymer 34 and the inorganic substrate 40.

Curing the polymer 34 to the inorganic substrate 40 may remove the part line 62 therebetween, as illustrated in FIG.

15. For example, the optical element 30 formed by the polymer 34 and the inorganic substrate 40 may monolithic after curing the polymer 34, i.e., a one-piece unit without any fasteners, joints, welding, adhesives, etc. As another example, a structure of the silicon-dioxide (e.g., an amorphous structure or polycrystalline structure) of the inorganic substrate 40 and the structure (e.g., an amorphous structure or polycrystalline structure) of the silicon-dioxide of the polymer 34 may be uniform with each other.

Figure 16:
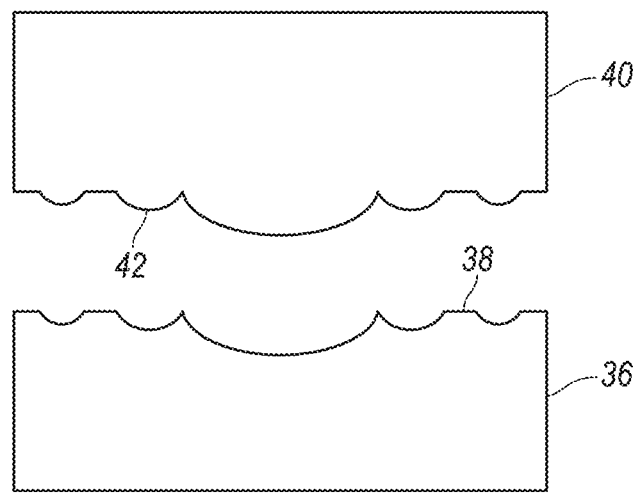
FIG. 16 is an illustration of the optical element released from the mold and having the sacrificial layer removed.

At the block 345 the optical element 30 is released from the mold 36, as illustrated in FIG. 16. For example, the optical element 30 may be mechanically separated, e.g., pulled, from the mold 36. As set forth above, the curing in block 340 is shown in FIG. 3 as occurring before release from the mold 36 in block 345 and, as another example the curing in block 340 may be performed after release from the mold 36.

Next, at the block 350 the sacrificial layer 60 is removed, e.g., from the mold 36 and/or the optical element 30. Removing the sacrificial layer 60 may include applying phosphoric acid ($H_3PO_4$) to the mold 36 and/or optical element 30. For example, the mold 36 and/or the optical element 30 may be immersed in phosphoric acid. Removing the sacrificial layer 60 may include applying oxygen plasma treatment to the mold 36 and/or the optical element 30, e.g., to remove photoresist used as the sacrificial layer 60. The optical element 30 created with the process 300 is used in a Lidar system 32. As another example removing the sacrificial layer 60 may include applying organic solvent to the mold 36 and/or the optical element 30.

With regard to the process 300 described herein, it should be understood that, although the steps of such process 300 have been described as occurring according to a certain ordered sequence, such process 300 could be practiced with the described steps performed in an order other than the order described herein. It further should be understood that certain steps could be performed simultaneously, that other steps could be added, or that certain steps described herein could be omitted. In other words, the description of the process 300 herein is provided for the purpose of illustrating certain embodiments and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of making an optical element, the method comprising:
   applying a polymer to a mold, the mold having microstructures with the polymer flowing into the microstructures when applied to the mold;
   pressing an inorganic substrate onto the polymer;
   curing the polymer to fix the polymer to the inorganic substrate to form the optical element from the polymer and the inorganic substrate, the optical element having microstructures formed by the microstructures in the mold, wherein the optical element is monolithic after curing the polymer; and
   releasing the optical element from the mold.

2. The method of claim 1, further comprising applying a sacrificial layer to the mold before applying the polymer to the mold.

3. The method of claim 2, wherein the sacrificial layer is a photoresist material, organic polymer, or silicon nitride.

4. The method of claim 2, further comprising removing the sacrificial layer after releasing the optical element from the mold.

5. The method of claim 4, wherein removing the sacrificial layer includes applying phosphoric acid, oxygen plasma treatment, or organic solvent to the mold or the optical element.

6. The method of claim 1, wherein curing the polymer to the inorganic substrate removes a part line therebetween.

7. The method of claim 1, wherein curing the polymer includes annealing the polymer and the inorganic substrate.

8. The method of claim 7, wherein the annealing is further defined as steam annealing.

9. The method of claim 1, wherein curing the polymer to the inorganic substrate includes curing the polymer and the inorganic substrate.

10. The method of claim 9, wherein the curing includes an ultraviolet curing process.

11. The method of claim 1, wherein applying the polymer to the mold includes spinning the polymer onto the mold.

12. The method of claim 1, further comprising forming the mold by applying a mask to a blank and subsequently etching the blank.

13. The method of claim 12, wherein the mask is a photoresist material and the etching includes plasma etching.

14. The method of claim 12, wherein the mask is a hard mask and the etching includes wet etching.

15. The method of claim 12, wherein the blank is nitride.

16. The method of claim 12, wherein the blank is metal.

17. The method of claim 1, wherein the mold is nickel plated.

18. The method of claim 1, wherein the inorganic substrate is silicon and the polymer is silicon after being cured.

19. The method of claim 1, wherein the polymer is a flowable oxide.

20. A method of making an optical element, the method comprising:
   applying a polymer to a mold, the mold having microstructures with the polymer flowing into the microstructures when applied to the mold;
   pressing an inorganic substrate onto the polymer;
   curing the polymer to fix the polymer to the inorganic substrate to form the optical element from the polymer and the inorganic substrate, the optical element having microstructures formed by the microstructures in the mold, wherein curing the polymer to the inorganic substrate removes a part line therebetween; and
   releasing the optical element from the mold.

21. A method of making an optical element, the method comprising:
   applying a polymer to a mold, the mold having microstructures with the polymer flowing into the microstructures when applied to the mold;
   pressing an inorganic substrate onto the polymer;
   curing the polymer to fix the polymer to the inorganic substrate to form the optical element from the polymer and the inorganic substrate, the optical element having microstructures formed by the microstructures in the mold, wherein the inorganic substrate is silicon and the polymer is silicon after being cured; and
   releasing the optical element from the mold.

* * * * *